Figure 7:
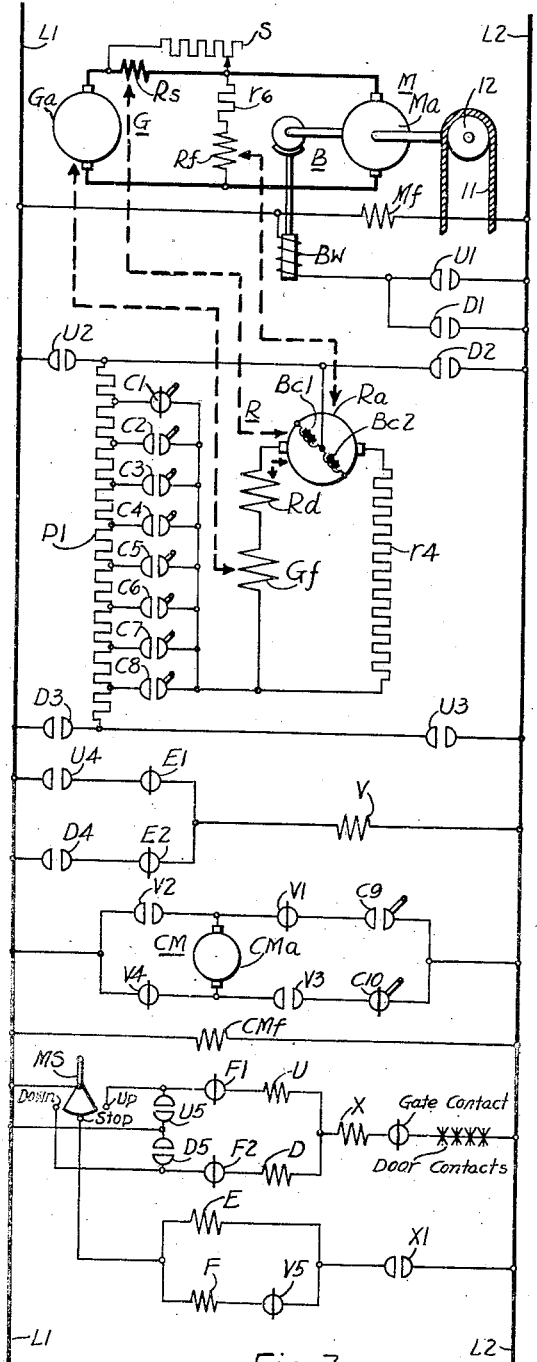

Dec. 28, 1937. W. F. EAMES 2,103,771
CONTROL SYSTEM
Filed Oct. 30, 1935 3 Sheets-Sheet 1
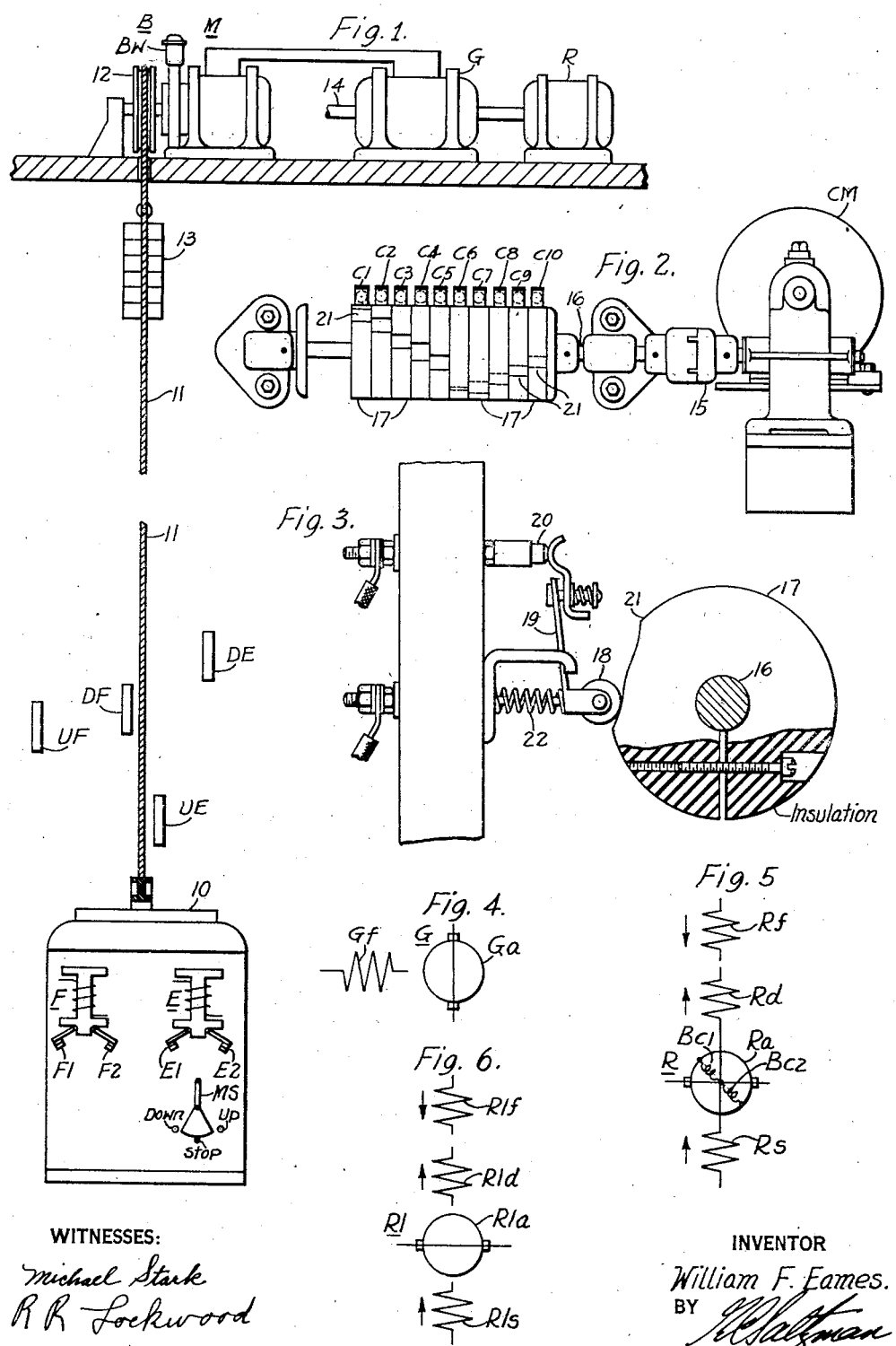
INVENTOR
William F. Eames.

Dec. 28, 1937.                  W. F. EAMES                    2,103,771
                               CONTROL SYSTEM
                            Filed Oct. 30, 1935            3 Sheets-Sheet 2

WITNESSES:
Michael Stark
R R Lockwood

INVENTOR
William F. Eames.
BY
ATTORNEY

Dec. 28, 1937.   W. F. EAMES   2,103,771
CONTROL SYSTEM
Filed Oct. 30, 1935   3 Sheets-Sheet 3

WITNESSES:
Michael Stark
R R Lockwood

INVENTOR
William F. Eames.
BY
ATTORNEY

Patented Dec. 28, 1937

2,103,771

UNITED STATES PATENT OFFICE 2,103,771

CONTROL SYSTEM

William F. Eames, Pittsburgh, Pa., assignor to Westinghouse Electric Elevator Company, Chicago, Ill., a corporation of Illinois Application October 30, 1935, Serial No. 47,465

10 Claims. (Cl. 172—239)

My invention relates generally to electric control systems. It has particular relation to control systems of the Ward-Leonard type and it constitutes a modification of the control system disclosed in the copending application of Santini and White, Serial No. 38,770, filed August 31, 1935 and assigned to the assignee of this application.

In the copending application of Santini and White a system is provided for automatically maintaining the speed of an elevator motor controlled by a Ward-Leonard control system at predetermined values corresponding to various settings of the controls regardless of the variations in load or other variations in the operating conditions of the system. This effect was accomplished by providing a direct-current regulator generator having field windings connected to be responsive to the current and voltage applied to the elevator motor. The armature of the regulator generator is connected across one pair of opposite terminals of a Wheatstone bridge, one leg of which includes the field winding of the generator of the Ward-Leonard control system. The remaining opposite pair of terminals of the Wheatstone bridge is connected to the usual independent control source for the generator field winding. In order to control the corrective action of the regulator generator in accordance with the deviation of the speed of the motor from predetermined speeds corresponding to various settings of the controls, the regulator generator is provided with a differential field winding which is connected in series circuit relation with the generator field winding and in the same leg of the Wheatstone bridge. When the speed of the motor corresponds to the setting of the controls, the effect of the differential field winding of the regulator generator is to counteract the effect of its field windings to be responsive to the motor. By means of the regulator generator connected in the Wheatstone bridge circuit, as described, it is possible to introduce a corrective effect into the field winding of the generator, as described in the application referred to hereinbefore, without affecting the current flow therethrough from the independent control source.

The herein described invention is an alternative system by means of which it is possible to effect the same control functions as provided by the aforesaid invention of Santini and White. This invention provides a means whereby the desired correction to maintain the desired motor speed or elevator car speed may be introduced into the control of the current flowing in the generator field winding independently and without effecting the current flow thereto from the usual independent control system.

The object of my invention, generally stated, is to provide a control system which shall be simple and efficient in operation and which may be readily and economically manufactured and installed.

The principal object of my invention is to provide for introducing a variable control current into the field winding of the generator of a Ward-Leonard control system independently of the current flowing therethrough from a fixed or predetermined control source.

An important object of my invention is to provide for connecting the field winding of the generator of a Ward-Leonard control system to a source of control current through a circuit connected electrically between the terminals of a regulating dynamo electric device which is connected to be responsive to the speed and load of the motor of the Ward-Leonard control system.

Another object of my invention is to provide for connecting the field winding of the generator of a Ward-Leonard control system to a source of control current through a circuit connected to the midpoint of a balance winding which is connected between the armature terminals of a regulator generator, the field windings of which are connected to be responsive to the speed and load of the motor of the Ward-Leonard control system.

Still another object of my invention is to provide for connecting the field winding of the generator of a Ward-Leonard control system to a source of control current through a circuit connected to the common connection between a pair of series connected armatures of a pair of regulator generators, the field windings of which are connected to be responsive to the speed and load of the motor of the Ward-Leonard control system.

Other objects of my invention will in part be obvious and in part appear hereinafter.

My invention, accordingly, is disclosed in the embodiment hereof shown in the accompanying drawings and comprises the features of construction, combination of elements and arrangement of parts which will be exemplified in the construction hereinafter set forth and the scope of the application of which will be indicated in the appended claims.

Figure 7A:
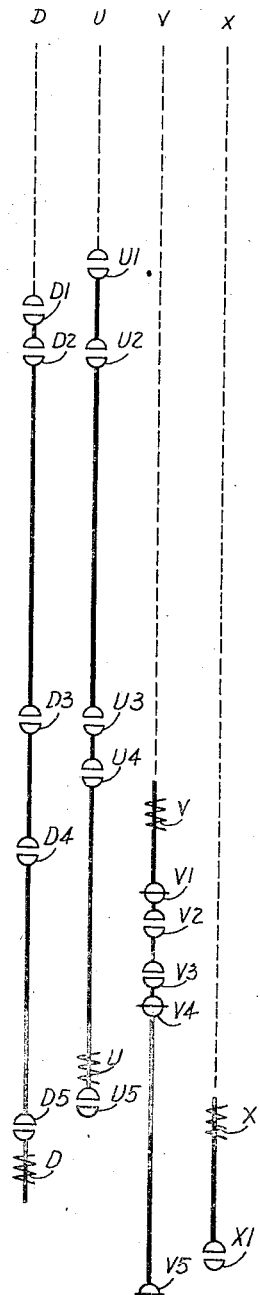
Figure 8:
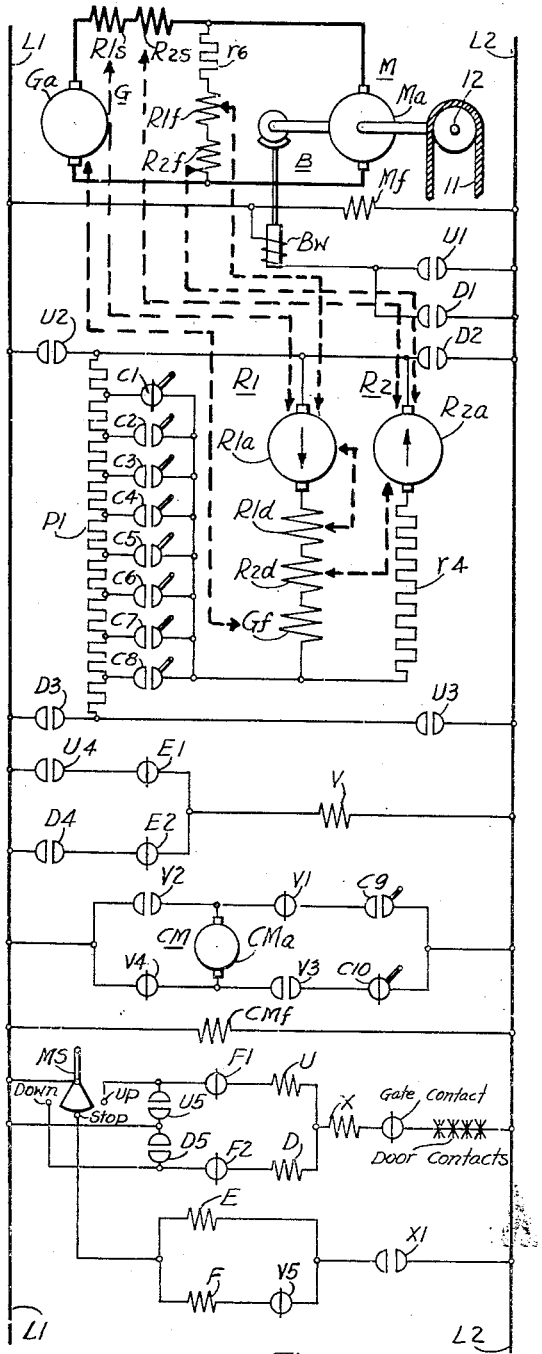
Figure 8A:
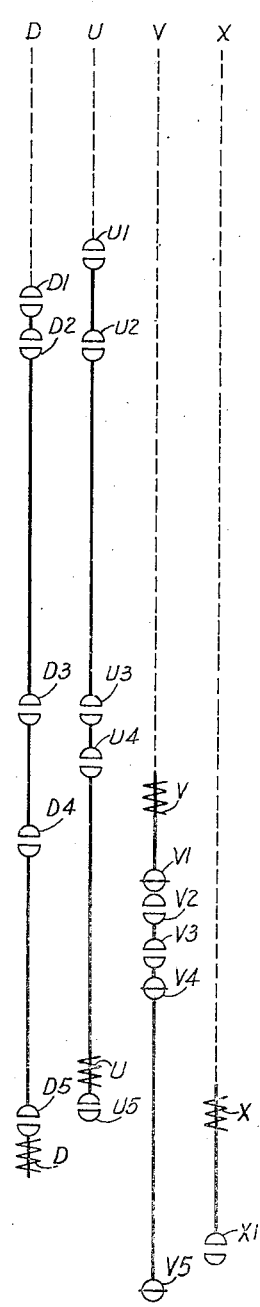

For a more complete understanding of the nature and scope of my invention, reference may be had to the following detailed description taken in connection with the accompanying drawings, in which Figure 1 illustrates diagrammatically the arrangement of an elevator car in a hatchway, Fig. 2 is a view in side elevation showing the construction of a controller used for varying the resistance connected in circuit with the main field winding of the generator, Fig. 3 is a view partly in side elevation and partly in section of a typical arrangement of the contact members of the control shown in Fig. 2, Fig. 4 illustrates schematically the arrangement of the generator armature and main field winding, Figs. 5 and 6 illustrate schematically two modifications of regulator generators which may be employed in practicing my invention, Fig. 7 illustrates diagrammatically one modification of my invention, Fig. 7A shows the relationship between certain of the various operating windings and contact members of the relays and switches illustrated in Fig. 7, Fig. 8 illustrates diagrammatically another modification of my invention, and Fig. 8A shows the relationship between certain of the various operating windings and contact members of the relations and switches illustrated in Fig. 8.

I have illustrated the two modifications of my invention in combination with a complete elevator system in order to fully and clearly point out the novel features and arrangement thereof. The complete system includes an elevator car, a Ward-Leonard control system and an inductor relay system responsive to the operation of a manually operable car switch for accelerating and decelerating the elevator car in the hatchway. It will be understood that the speed control circuits illustrated herein have been shown merely for the purpose of demonstrating the invention and that the invention may be practiced in combination with other control circuits without distinguishing from the spirit and scope thereof.

According to my invention, instead of using the Wheatstone bridge circuit of Santini and White mentioned hereinbefore, I have provided for connecting the independent control source to a point which is electrically midway between the terminals of the regulating means. By this connection, I am able to eliminate two of the arms of the Wheatstone bridge and to provide an alternative system which will introduce the desired corrective action into the main field winding of the generator.

In one modification of the invention, I have provided a single direct-current generator having differentially related series and shunt field windings which are connected, respectively, to be responsive to the current and voltage supplied to the motor of the Ward-Leonard control system by the generator. The regulator generator is further provided with a differential field winding which is connected in series circuit relation with the main generator field winding. Its effect is differential with regard to the combined effects of the series and shunt field windings. One of the terminals of the armature of the regulator generator is connected to the circuit including the main generator field winding and the differential field winding of the regulator generator. The other armature terminal is connected to a resistor. Both the resistor and the circuit including the main field winding of the generator and the differential field winding of the regulator generator are arranged to be connected to one terminal of the independent control source.

In order to connect the other terminal of the independent control source to the armature of the regulator generator, a pair of balance coils is provided and connected in series circuit relation across diametrically opposite points of the armature. The independent control circuit is then connected to the midpoint or the common connection between the two balance coils, thus providing a connection to the armature of the regulator generator which is always midway between its terminals. By means of these circuit connections, it is possible to introduce the corrective effect into the main field winding of the generator without affecting in the least the current flowing therethrough from the independent control source.

In a modification of the invention, I have provided for using two regulator generators having their armatures connected in series circuit relation. Each of the generators is provided with series shunt and differential field windings. The series and shunt field windings are, respectively, connected in series circuit relation with each other and to be responsive to the current and voltage supplied to the motor of the Ward-Leonard control system. Both differential field windings are arranged to be connected in series circuit relation with the main field winding of the generator and the combination to be connected in series circuit relation with one of the armatures of the two regulating generators. A resistor is connected in series circuit relation with the other armature and the circuit including the differential field windings and the main field winding of the generator are connected to one terminal of the independent control source. The other terminal of the independent control source is connected to the common connection between the two armatures. In this manner it is possible to also introduce the corrective action from the pair of regulator generators into the main field winding of the generator without altering the current flow therethrough from the independent control source.

Referring now particularly to Fig. 1 of the drawings, the reference character 10 designates, generally, an elevator car which may be supported in a hatchway or shaft by means of a cable 11 which is passed over a sheave 12 and balanced by suitable counterweights 13. The elevator car 10 is provided with a slowdown inductor relay E and a landing inductor relay F. The slowdown inductor relay E is provided with normally closed contact members E1 and E2 while the landing inductor relay F is provided with normally closed contact members F1 and F2. When the operating winding of the slowdown inductor relay E is energized, no action takes place until the contact members E1 or E2 come into proximity, respectively, with the inductor plates UE and DE, depending upon the direction of travel of the elevator car. Assuming that the elevator car 10 is travelling in the up direction, and that the operating winding of the slowdown inductor relay E is energized, the contact members E1 will be opened as soon as they are moved into proximity to the inductor plate UE. A resulting control function then takes place which will be set forth hereinafter. The contact members F1 and F2 of the landing inductor relay F are also opened when they come into proximity, respectively, to the inductor plates UF and DF. The elevator car 10 is also provided with a master switch MS having three positions, the extreme outer positions corresponding to up and down movement of the car, and the central position to a position to stop the car.

In order to operate the elevator car 10 in the hatchway, a Ward-Leonard control system is provided which comprises a motor M that is arranged to be mechanically coupled, as illustrated, to the sheave 12. As shown in Figs. 7 and 8 of the drawings, the motor M comprises an armature Ma and a main field winding Mf, the latter being arranged to be separately excited from normally energized conductors L1 and L2. A brake B is provided having a brake-releasing winding Bw for releasing it on energization of the motor M.

The motor is arranged to be energized by means of a generator G having, as shown in Figs. 7 and 8, an armature Ga and a main field winding Gf. The armature Ga of the generator G is arranged to be mounted on a shaft 14 which may be driven by any suitable motive means, such as an induction motor (not shown), that may be connected to an alternating-current source of supply.

In order to control the functioning of the system shown in Fig. 7 of the drawings, a regulator generator R, diagrammatically shown in Fig. 5 of the drawings, is provided having an armature Ra which may be mounted on the shaft 14. As illustrated, the regulator generator R is provided with a shunt field winding Rf, a differential field winding Rd and a series field winding Rs. As indicated by the arrows, the differential field winding Rd and the series field winding Rs are arranged to generate flux in a direction opposite to the direction of the flux generated by the shunt field winding Rf of the regulator generator. In order to provide a connection electrically midway between the terminals of the armature Ra, balance windings Bc1 and Bc2 are connected at diametrically opposite points, so that the common connection between them will constitute a midpoint between the terminals of the armature. The particular connections for the various field windings and the armature of the regulator generator are illustrated in Fig. 7 of the drawings, in which the various generator field windings are indicated as connected to the corresponding generator armatures by means of dotted lines terminating in arrow heads.

The series field winding Rs is so proportioned with reference to the shunt field winding Rf, that their respective magnetomotive forces bear the same ratio as the IR drop in armature Ma of the motor M and the terminal voltage appearing across the latter armature. The total magnetomotive force produced by both windings Rs and Rf, accordingly, is proportional to the counter-electromotive force of the motor M, which is proportional to the actual speed of motor M, neglecting minor errors. The differential winding Rd produces a magnetomotive device, dependent upon the setting of the potentiometer P, which determines the value of speed of motor M which the regulator tends to maintain.

Referring now particularly to Fig. 7 of the drawings, in response to the operation of the master switch MS, up or down reversing switches U and D are operated. On the operation of either of the up or down switches, an auxiliary switch X is operated to complete a circuit for energizing the operating windings of the inductor relays E and F.

As soon as either the up or the down switch U or D is operated, a potentiometer P1 is connected across the conductors L1 and L2. The current flowing through the potentiometer P1 is in one direction when the up reversing switch U is energized, and in a reverse direction when the down reversing switch D is energized.

In order to accelerate the motor M, the current flowing through the main generator field winding Gf is increased by increasing the voltage applied thereto from the potentiometer P1. This voltage is gradually increased by the successive closing and opening of contact members C2 through C7, which as shown in Figs. 2 and 3 of the drawings, are arranged to be successively operated by means of a control motor CM. The control motor CM is arranged to operate through a reduction gearing mechanism 15 to rotate a shaft 16 on which a series of cams 17, composed of insulating material, is mounted. As shown more clearly in Fig. 3 of the drawings, a cam 17 is arranged to engage a roller 18 on the periphery thereof and to normally hold a movable contact member 19 out of engagement with a fixed contact member 20. The cam 17 is provided with a recessed portion 21 which is arranged to permit the roller 18 to move under the influence of a biasing spring 22, so that the movable contact member 19 is permitted to engage the fixed contact member 20. It will be understood that the cams 17 may be positioned on the shaft 16 in any desired relative position to effect the sequential opening and closing of the contact members C1 through C8, as may be desired. In order to stop the operation of the control motor CM after it has reached its limit of travel, contact members C9 and C10 are provided. The contact members C10 are arranged to remain in the closed position until the control motor has reached its limit of travel after being initially energized. At this time contact members C10 are opened to terminate further motion of the control motor CM in this direction, contact members C9 having been closed as soon as the contact motor CM was energized. The contact members C9 are arranged to remain in the closed position until the control motor CM has been restored to the initial position, at which time they are opened. It will be understood that the cams 17, associated with these contact members, may be suitably arranged to effect this desired operation.

As illustrated in Fig. 7 of the drawings, the control motor CM is provided with an armature CMa and a separately excited field winding CMf. The direction of rotation of the armature CMa is effected by reversing the polarity of the voltage applied thereto from the conductors L1 and L2 by means of a speed relay V.

It is desirable to independently control the flow of current through the main field winding Gf of the generator from two sources, one of the sources comprising the energized conductors L1 and L2 across which the potentiometer P1 is connected, and the other source comprising the armature Ra of the regulator-generator. For this purpose, the main field winding Gf is connected in series circuit relation with the differential field winding Rd and to one terminal of the armature Ra. A resistor r4 is connected to the other terminal of the armature Ra. As illustrated, the remaining terminal of the resistor r4 and the main field winding Gf are connected to a common point and are arranged to be connected to the independent control source comprising the conductors L1 and L2. The common connection between the balance coils Bc1 and Bc2 is connected, as illustrated, to the independent control source. By means of these connections, it is possible to control the corrective action of the regulator generator R, as represented by the voltage generated in the armature Ra in a manner which will not affect the current flowing through the main field winding Gf from the control source represented by the conductors L1 and L2. In other words, the current flowing through the main field winding Gf from the independent control source will be unaffected by the current which is caused to flow through the main field winding Gf from the armature Ra, the magnitude and direction of which is a function of the load and speed of the motor M.

In describing the operation of the system shown in Fig. 7 of the drawings, it will be assumed that the conductors L1 and L2 have applied thereto a suitable control voltage, that the generator G and the regulator-generator R are being operated at the proper speed and that it is desired to move the elevator car 10 in the up direction. The operator then moves the master switch MS to the up position to effect the energization of the operating winding of the up reversing switch U, as well as the energization of the operating winding of the auxiliary switch X. The circuit for effecting the energization of these windings may be traced as follows:

L1, MS, up contacts, F1, U, X, gate contact, door contacts, L2.

At contact members U5, a holding circuit is provided around the master switch MS. The brake B is released by the energization of the brake winding Bw in response to the operation of the up reversing switch U. The circuit for releasing the brake winding may be traced as follows:

L1, Bw, U1, L2.

The potentiometer P1 is connected directly across the conductors L1 and L2 on the closure of contact members U2 and U3 in response to the operation of the up reversing switch U. Current is then caused to flow through the main generator field winding Gf in part because of the voltage which is obtained from the first section of the potentiometer P1, due to the fact that contact members C1 are closed, and in part because of the voltage which is obtained from the armature Ra of the regulator generator R.

The operating winding of the speed relay V is energized in response to the operation of the up reversing switch U over a circuit which may be traced as follows:

L1, U4, E1, V, L2.

As a result of the energization of the speed relay V, a circuit is completed for energizing the armature CMa of the control motor CM. This circuit may be traced as follows:

L1, V2, CMa, V3, C10, L2.

The contact members C1 are then opened and the remaining contact members C2 through C7 are successively closed and opened, contact members C8 being closed but not opened, thereby increasing the voltage which is applied to the main generator field winding Gf to correspondingly increase the voltage which is applied to the armature Ma of the motor M. As soon as the contact members C10 are opened, the armature CMa is deenergized, contact members C8 remaining closed.

As has been set forth hereinbefore, it is desirable that the speed of the motor M be at a certain value for each of the steps of control voltage obtained from the potentiometer P1. It is then possible to obtain a smooth acceleration curve which will be unaffected by the many variables in the system that have been set forth in detail hereinbefore. In addition, it is also desired that the same speed relationship exist when the contact members C1 through C8 are operated in a reverse order to effect the deceleration of the motor M and the elevator car driven thereby.

It has been found that the desired speed relationship will exist regardless of the variable characteristics of the elevator system, or the connections to the potentiometer P1, when the regulator-generator R is employed, its armature Ra connected through the balance coils Bc1 and Bc2 to the potentiometer P. Because of the connection of the differential field winding Rd in series circuit relation with the main generator field winding Gf in one of the branches of the bridge circuit, the changes which are introduced to effect a corrective action through the generator G are immediately reflected in the voltage which is generated in the armature Ra of the regulator-generator. As a result, the corrective effect which is applied by the regulator-generator R is, in a sence, proportional to the degree of variation in the speed of the motor M from the desired speed.

When it is desired to stop the elevator car at a particular floor, the operator centers the master switch, thereby completing a circuit for energizing the operating winding of the slowdown inductor relay E. This circuit may be traced as follows:

L1, MS, stop contacts, E, X1, L2.

As soon as the contact members E1 come into proximity with the up inductor plate UE they are opened and the previously traced energizing circuit for the operating winding of the speed relay V is interrupted.

The armature of the control motor CMa is energized in a reverse direction to effect the operation of the contact members C1 through C8 in a reverse sequence. The circuit for now energizing the control motor armature CMa may be traced as follows:

L1, V4, CMa, V1, C9, L2.

The contact members C7 through C2 are successively closed and opened to effect a decrease in the flow of current through the main generator field winding Gf. During this interval, the regulator-generator R is effective to maintain the speed of the motor M at values corresponding to the contact members which are closed. As a result, regardless of the variable conditions or loading of the elevator system, or the connections to the potentiometer P1, the elevator car 10 will be decelerated at a uniform rate.

A further result of the deenergization of the speed relay V is to close contact members V5 and to complete an obvious energizing circuit for the operating winding of the landing inductor relay F in parallel with the operating winding of the slowdown inductor relay E. As soon as contact members F1 come into proximity with the up inductor plate UF, the previously traced energizing circuit for the operating winding of the up reversing switch U and the auxiliary switch X is interrupted. These switches are deenergized. The potentiometer P1 is disconnected from the conductors L1 and L2 and the previously traced energizing circuit for the brake winding Bw is opened. The brake B is then applied and the elevator car 10 is brought to rest at the desired floor.

In the modification of the invention illustrated in Fig. 8 of the drawings, it will be observed that two regulator generators R1 and R2 are provided instead of the single regulator generator R illustrated in Fig. 7 of the drawings. The arrangement of the field windings and armatures of the regulators R1 and R2 is illustrated in Fig. 6 of the drawings. Since the generators R1 and R2 are duplicates, only one of them is illustrated in Fig. 6. The regulator generators R1 and R2 are respectively provided with series field windings R1s, R2s, shunt field windings R1f, R2f and differential field windings R1d, R2d. The connection of generator field windings and corresponding generator armatures is indicated in Fig. 8 by means of dotted line terminating in arrow heads, as in Fig. 7.

The circuit connections for the field windings of the regulator generators R1 and R2 are illustrated in Fig. 8 of the drawings. As there shown, the series field windings R1s and R2s are connected in series circuit relation and in series circuit relation with the generator armature Ga and the motor armature Ma, so that they will be responsive to the flow of current to the motor M. The shunt field windings R1f and R2f are connected in series circuit relation through a resistor r6 across the terminals of the motor armature Ma, so that they will be responsive to the voltage which is applied to the motor armature. The differential field windings R1d and R2d are connected in series circuit relation and in series circuit relation with the main field winding Gf and the combination is connected in series circuit relation with the armature R1a of the regulator generator R1. The armature R2a of the regulator generator R2 is connected in series circuit relation with the armature R1a and has connected in series circuit relation with it the resistor r4. The resistor r4 and the main field winding Gf are connected together and arranged to be connected to the independent control source represented by the conductors L1 and L2. The common connection between the armatures R1a and R2a of the regulator generators R1 and R2 is also arranged to be connected to the independent control source represented by the conductors L1 and L2. By means of these circuit connections, it is possible to introduce the necessary corrective action into the main field winding Gf without altering the current flow therethrough from the independent control source. The speed of the motor M and correspondingly the speed of the elevator car 10 will then be maintained at predetermined values corresponding to the setting of the controls, as represented by the connections to the potentiometer P1, regardless of variations in load or other operating conditions of the system.

Since the functioning of the remaining elements of the system illustrated in Fig. 8 of the drawings is identical with the functioning of the corresponding elements illustrated in Fig. 7 of the drawings and described in detail hereinbefore, a detailed description of the functioning of the two regulator generators R1 and R2 in the system is deemed unnecessary and is, therefore, omitted.

Since further changes may be made in the foregoing constructions and different embodiments of the invention may be made without departing from the scope thereof, it is intended that all matter shown in the accompanying drawings or set forth in the foregoing description shall be interpreted as illustrative and not in a limiting sense.

I claim as my invention:

1. In a Ward-Leonard control system, in combination, a first dynamo-electric device operatively connected to a load, a second dynamo-electric device electrically connected to said first device, a field winding for said second device, regulating dynamo-electric means disposed to be responsive to the speed of said first dynamo-electric device and connected to energize said field winding, and means for connecting said field winding to a source of control current through a circuit connected substantially midway between the terminals of said regulating dynamo-electric means.

2. In a Ward-Leonard control system, in combination, a first dynamo-electric device operatively connected to a load, a second dynamo-electric device electrically connected to said first device, a field winding for said second device, direct current generating means disposed to be responsive to the speed of said first dynamo-electric device and connected to energize said field winding, said direct current generating means being provided with a connection substantially midway between its terminals, and means for connecting said field winding to a source of control current through said connection.

3. In a Ward-Leonard control system, in combination, a first dynamo-electric device operatively connected to a load, a second dynamo-electric device electrically connected to said first device, a field winding for said second device, a direct current generator disposed to be responsive to the speed of said first dynamo-electric device and connected to energize said field winding, means for obtaining a connection electrically between the output terminals of said generator, and means for connecting said field winding to a source of control current through said connection.

4. In a Ward-Leonard control system, in combination, a first dynamo-electric device operatively connected to a load, a second dynamo-electric device electrically connected to said first device, a field winding for said second device, a direct current generator disposed to be responsive to the speed of said first dynamo-electric device and connected to energize said field winding, a balance coil connected between the output terminals of said generator and provided with a connection substantially midway between the ends thereof, and circuit means for connecting said field winding to a source of control current through said connection.

5. In a Ward-Leonard control system, in combination, a first dynamo-electric device operatively connected to a load, a second dynamo-electric device electrically connected to said first device, a field winding for said second device, a direct current generator having an armature connected to energize said field winding, shunt, series and differential field windings in said generator, said shunt and series field windings being respectively responsive to the voltage across and the current flowing between said first and second devices, said differential field winding being connected in series circuit relation with said first mentioned field winding, a balance coil connected between the terminals of said armature and provided with a connection substantially midway between the ends thereof, and circuit means for connecting said first mentioned field winding to a source of control current through said connection.

6. In a Ward-Leonard control system, in combination, a first dynamo-electric device operatively connected to a load, a second dynamo-electric device electrically connected to said first device, a field winding for said second device, a pair of series circuit connected dynamo-electric devices connected to energize said field winding, and means for connecting said field winding to a source of control current through a circuit connected between said pair of dynamo-electric devices.

7. In a Ward-Leonard control system, in combination, a first dynamo-electric device operatively connected to a load, a second dynamo-electric device electrically connected to said first device, a field winding for said second device, a pair of series connected direct current generators connected to energize said field winding, and means for connecting said field winding to a source of control current through a circuit connected between said pair of direct current generators.

8. In a Ward-Leonard control system, in combination, a first dynamo-electric device operatively connected to a load, a second dynamo-electric device electrically connected to said first device, a field winding for said second device, a pair of series connected direct current generators disposed to be responsive to the speed of said first dynamo-electric device and connected to energize said field winding, and means for connecting said field winding to a source of control current through a circuit connected between said pair of direct current generators.

9. In a Ward-Leonard control system, in combination, a first dynamo-electric device operatively connected to a load, a second dynamo-electric device electrically connected to said first device, a field winding for said second device, a pair of series connected direct current generators disposed to be responsive to the speed of said first dynamo-electric device and connected to energize said field winding, a differential series field winding in each of said direct current generators and disposed to oppose the action thereof in response to the speed of said first dynamo-electric device, said differential field windings being connected in series circuit relation with said first mentioned field winding, and means for connecting said first mentioned field winding to a source of control current through a circuit connected between said pair of direct current generators.

10. In a Ward-Leonard control system, in combination, a first dynamo-electric device operatively connected to a load, a second dynamo-electric device electrically connected to said first device, a field winding for said second device, a pair of direct current generators provided with series connected armatures connected to energize said field winding, each of said generators being provided with a shunt, series, and differential field winding, said shunt and series field windings being connected to be respectively responsive to the voltage across and the current flowing between said first and second devices, said differential field windings being connected in series circuit relation with said first mentioned field winding, and means for connecting said first mentioned field winding to a source of control current through a circuit connected between said armatures.

WILLIAM F. EAMES.